United States Patent [19]

Jose et al.

[11] Patent Number: 4,994,333

[45] Date of Patent: Feb. 19, 1991

[54] GALVANIC PRIMARY CELL

[75] Inventors: Horst-Udo Jose; Gerd Jung, both of Ellwangen, Fed. Rep. of Germany

[73] Assignee: Varta Batterie Aktiengesellschaft, Hanover, Fed. Rep. of Germany

[21] Appl. No.: 437,019

[22] Filed: Nov. 15, 1989

[30] Foreign Application Priority Data

Jan. 30, 1989 [DE] Fed. Rep. of Germany ....... 3902650

[51] Int. Cl.$^5$ ............................................. H07M 6/06
[52] U.S. Cl. ...................................... 429/190; 429/229
[58] Field of Search ................................. 429/229, 190

[56] References Cited

U.S. PATENT DOCUMENTS 2,960,558  11/1960  Marsal et al. ................... 429/190 X
4,592,974   6/1986  Takeda et al. ...................... 429/229
4,735,876   4/1988  Miura et al. ..................... 429/229 X

*Primary Examiner*—Stephen J. Kalafut
*Attorney, Agent, or Firm*—Weiser & Stapler

[57] ABSTRACT

In an acid-type primary cell with a zinc anode containing non-toxic or only little harmful substances, the usual toxic components of the zinc alloy such as mercury and cadmium are replaced by at least one of the elements indium and bismuth, and by at least one of the elements magnesium and lithium. These nonpoisonous substitutes inhibit hydrogen on the zinc and provide a degree of mechanical tensile strength with more conventional zinc anodes. Additionally, a slight amount of lead is alloyed with the zinc anode to maintain ductility during the rolling process and as a supplemental protection against corrosion.

6 Claims, 2 Drawing Sheets

GALVANIC PRIMARY CELL

BACKGROUND OF THE INVENTION

This invention relates generally to an acid-type galvanic primary cell with a zinc anode, a depolarizing cathode and a gel electrolyte, and in particular, to metal additives which are useful to suppress zinc corrosion and improve mechanical tensile strength.

The present invention primarily relates to acidic zinc/$MnO_2$ cells (Leclanche cells) and zinc/oxygen cells. In such cells, the zinc electrode is generally implemented as a can or hollow cylinder which contains the remaining active cell components (e.g., a $MnO_2$/carbon black mixture pressed around a carbon rod conductor, as the cathode; an electrolytic paste; and a separator substrate). Less frequently, the electrode is implemented as a flat metal plate in a coated cell structure.

According to R. Huber, "Dry Batteries", page 29 (VARTA Handbook Series, Volume 2, 1972), the properties of the anode plate are dependent on its method of manufacture, and its alloying with different quantities of lead and cadmium (the lead content can amount to as much as 0.6%). The alloyed lead increases ductility during the rolling and extrusion process, and also provides a slightly inhibiting effect on zinc corrosion. The addition of cadmium improves the mechanical tensile strength of the zinc-anodes during the battery manufacturing process.

In using zinc metal is dissolved in the battery during current drain with increasing duration. However, aside from this "useful" dissolution, a slight autodissolution of the zinc occurs, especially in case of extended storage periods of the cell, and even more at increased temperature. This is attributable to the fact that although the reaction of zinc in acidic solution is kinetically inhibited, the hydrogen formation occurs at a potential that is too low to stop the dissolution. The gradual accumulation of hydrogen in the interior of the cell leads to an increase in pressure, which under unfavorable circumstances can result in cell deformation, or even in a loss of electrolyte. If this hydrogen formation and dissolution of the zinc anode in an unloaded condition are not suppressed, then an undesirable reduction in capacity also occurs.

The recognized method for suppressing zinc corrosion and hydrogen formation, through an increase in the hydrogen over voltage, is to add mercury to the zinc. However, because of this, the number of components in the zinc which are classified as toxic and harmful to the environment increases to three (i.e., mercury, lead and cadmium). Because of this, constant efforts have been made to achieve a substitution for at least the particularly poisonous metals Hg and Cd. For example, DE-AS 1,086,309 describes an electrode of refined zinc with an additive of indium metal, while DE-OS 3,229,703 describes the use of indium and gallium as metals alloyed with the zinc. JP-OS 60-170751 (Toshiba Denchi K.K.) describes the addition of Pb and Li to zinc, while JP-OS 60-32249 (Touhou Aen. K.K.) recommends a zinc alloy of at least 0.01% Ag and other metals. Finally, DE-OS 36 05 718 discloses a zinc anode of refined zinc with an alloying addition of up to 0.6% Pb.

Despite the multitude of familiar alloying combinations involving zinc electrodes, only some of which are mentioned here, the basic purpose remained to improve the above-mentioned primary cell with non-toxic additives, particularly insofar as the zinc electrode is concerned, which permit the cell to perform equally well to a conventional acidic primary cell.

SUMMARY OF THE INVENTION

It is therefore the primary object of the present invention to provide non-toxic additives for an acid-type galvanic primary cell with a zinc anode which permit the cell to operate equally well to a conventional cell of this general type.

It is also an object of the present invention to provide a non-toxic substitute for the toxic and harmful components of conventional acid-type galvanic primary cells with zinc anodes.

It is also an object of the present invention to provide non-toxic additives of this general type which permit the cell to exhibit the good electrical functioning and electrode quality which were previously achieved using toxic components.

These and other objects are achieved in accordance with the present invention by providing an acid-type galvanic primary cell having a zinc anode containing metal additives for suppressing zinc corrosion and for improving mechanical tensile strength, a depolarizing cathode and a gel electrolyte, wherein the cell's anode is comprised of refined zinc, to which are added at least one of the metals indium and bismuth, and at least one of the metals magnesium and lithium.

It has been found that the inhibiting effect of mercury can be achieved if, either individually or in combination, the metals indium and bismuth are added to the zinc, or their salts added to the electrolytic solution instead of using mercury or its salts. The magnesium and/or lithium additives are advantageously exchanged for the cadmium which was responsible for the mechanical stability of the zinc electrode. This doping of metals can be accomplished by precipitation on the zinc surface, or as is preferred, by the alloying of components with the zinc metal.

For further detail regarding a galvanic primary element produced in accordance with the present invention, reference is made to the description which is provided below, taken in conjunction with the following illustrations.

DETAILED DESCRIPTION OF PREFERRED EMBODIMENTS

Generally speaking, the galvanic primary cell of the present invention incorporates a negative electrode comprised of refined zinc, to which are added at least one of the metals In and Bi, and at least one of the metals Mg and Li. It has been found to be particularly advantageous if the zinc anode further contains Pb, in a quantity which lies within the framework of the ranges suggested by the earlier referenced Huber article. Thus, according to the present invention, the anode zinc preferably contains 0.01 to 0.6% Pb, with 0.02 to 0.1% Pb being particularly preferred in this regard.

Independent of this optional addition of lead, the other metal content in the zinc according to the present invention should in each instance lie within the following ranges.

0.0005 to 0.1% In; 0.0005 to 0.05% Bi
0.0001 to 0.1% Mg; 0.0005 to 0.05% Li.

Particularly preferred percentages are:

0.003 to 0.03% In; 0.001 to 0.01% Bi
0.0001 to 0.002 Mg; 0.001 to 0.01% Li.

To determine the effectiveness of the alloying additives of the present invention, experimental cells (A, B, C, D, E) were produced and subjected to various tests, compared with conventional or production-like experimental cells (F, G). In the case of the experimental cells, for the possible combinations noted above, the following anode alloys were used:

(A) Zn+0.01% In+0.0005% Mg
(B) Zn+0.005% In+0.001% Bi+0.0003% Mg
(C) Zn+0.025% Pb+0.01% In+0.0003% Mg
(D) Zn+0.1% Pb+0.01% In+0.005% Li

The comparison cells had the following anode alloys:

(F) Zn+0.25% Pb+0.06% Cd
(G) Zn+0.6% Pb.

The cathode materials included electrolytic $MnO_2$, acetylene carbon black, zinc oxide and a zinc chloride solution, and were the same in all cells. Separation between the anode and the cathode was accomplished by a conventional paper separator coated with a gel.

The favorable results of the experiments which were performed are shown in FIGS. 1 to 4.

Figure 1:
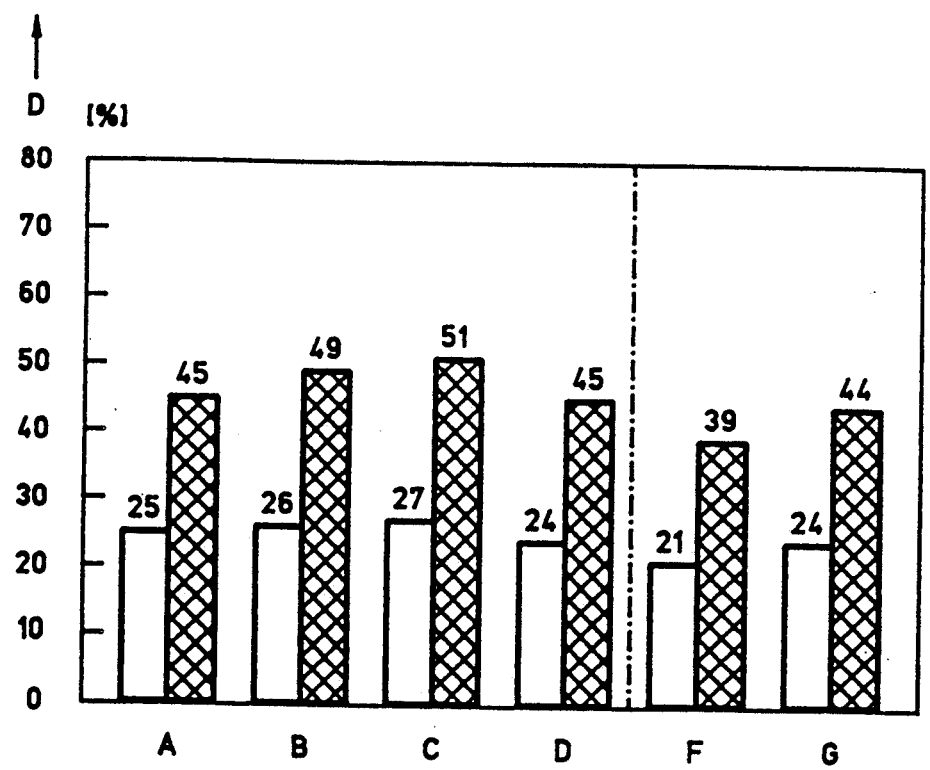
FIG. 1 is a graph showing the characteristics of cylindrical anode components formed of zinc alloys in accordance with the present invention, under mechanical deformation.

FIG. 1 illustrates, in detail, the diameter reduction experienced by an anode cylinder of a primary cell having an IEC designation "R 20"(h=61.5 mm, o=34.2 mm), when exposed to a mechanical energy influence of 0.5 Joule (white bar) and 1.0 Joule (cross-hatched bar). The designations A to D, F and G correspond to the zinc alloys defined above. The numbers 0 to 80 noted along the ordinate of the diagram represent the degree of deformation (D) expressed in percent. From the bar lengths, it is seen that the alloys A to D (which employ non-toxic or little harmful material) are only very insignificantly behind the conventional alloys F and G in terms of their mechanical tensile strength.

Figure 2:
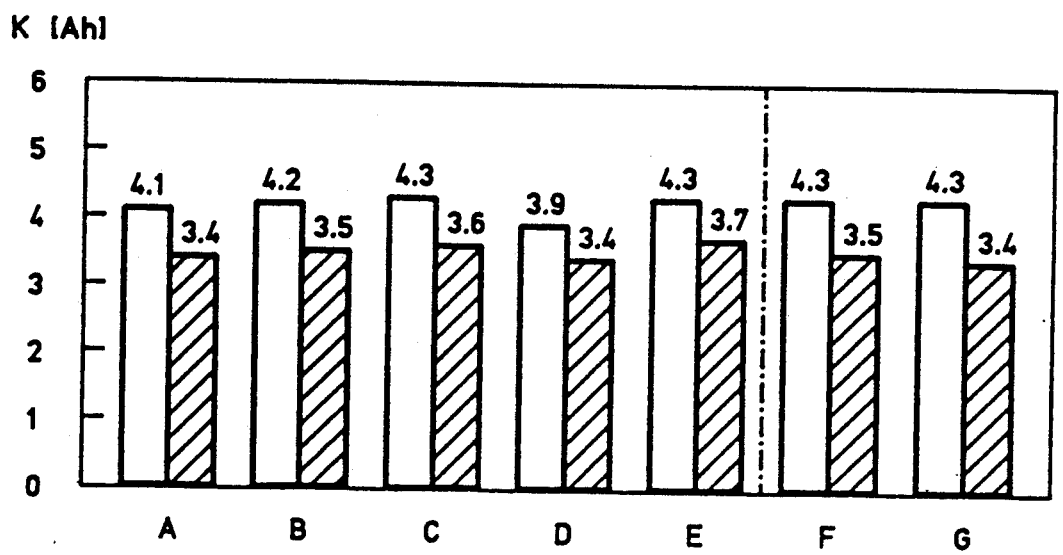
FIGS. 2 to 4 are graphs showing the capacities of primary cells having zinc anodes in accordance with the present invention, under various load conditions.
Figure 3:
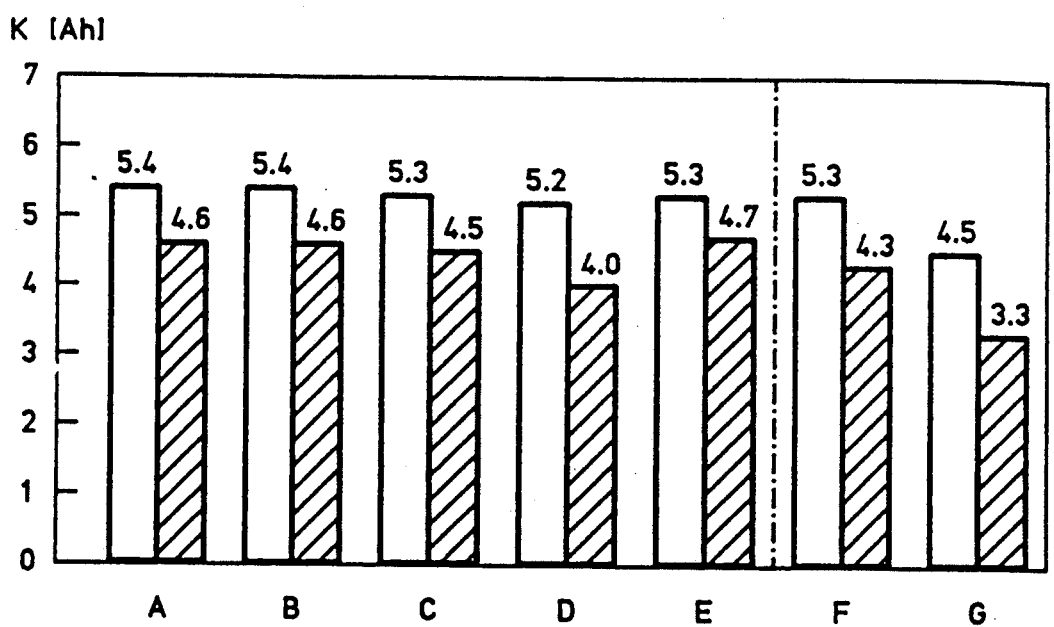
Figure 4:
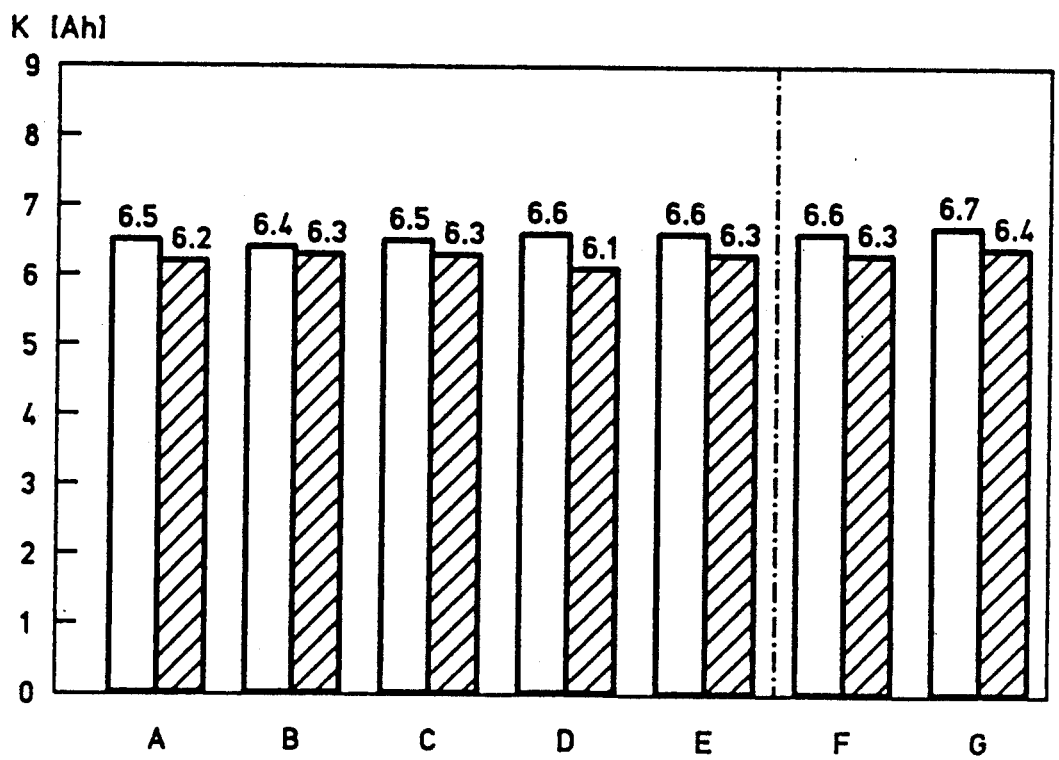

Referring now to FIGS. 2 to 4, the designations A to G again relate to the experimental cells, which differ only in the alloying composition of their zinc anodes. The capacities (K) measured in Ah are represented in terms of their dependence upon the discharge process. Accordingly, FIG. 2 represents a continuous 5.1 Ohm discharge up to a final voltage of 1.0 volt. FIG. 3 represents a discharge according to the Light Industrial Flashlight Test (LIFT) standard (i.e., four minutes per hour, eight hours per day) across 2.2 Ohms up to a final voltage of 0.9 volt. FIG. 4 represents an intermittent discharge of four hours per day across 20 Ohms up to a final voltage of 0.9 volts. All white bars represent fresh cells, and all hatched bars represent cells which were stored at 45° C. for three months prior to the discharge.

In general, these electrical tests show that primary cells A to E, which according to the present invention include non-toxic or little harmful material, are at least equal in performance to the comparison cells F and G, with conventional zinc anodes, in terms of their capacities. Therefore, it is possible to avoid not only the use of mercury, but even beyond the already familiar Hg-free zinc alloys, to avoid use of the very toxic cadmium as an alloying metal. This is because, according to the present invention, the corrosion-protecting role of mercury can be assumed by indium and/or bismuth, and the cell-specific characteristics of cadmium, as well as lead, which are principally responsible for the mechanical behavior of the zinc during processing, can be achieved with magnesium and/or lithium. As previously indicated, in addition to the use of these replacement metals, a slight residual amount of lead in the refined zinc can also be advantageous.

These experimental findings were confirmed, in principle, in additional cells which contained a $NH_4Cl$ electrolyte, instead of a $ZnCl_2$ electrolyte, and having a cathode comprised of natural manganese dioxide instead of electrolytic manganese dioxide. As a result, regarding zinc alloys, what has been said is generally valid for all acidic primary cells, whether they be zinc-chloride cells or ammonium-chloride cells. Thus, the present invention makes available a zinc anode which is of comparable quality to those known to date in terms of electrical output and storage capability, but which is of no environmental concern because of the absence of poisonous components.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A galvanic primary cell comprising a depolarizing cathode, an acidic gel electrolyte and a zinc anode of refined zinc including metal additives for suppressing zinc corrosion and for improving mechanical tensile strength comprising at least one metal selected from the group consisting of indium and bismuth and at least one metal selected from the group consisting of magnesium and lithium.

2. The primary cell of claim 1 wherein lead is also alloyed with the refined zinc.

3. The primary cell of claim 2 wherein the quantity of lead alloyed with the refined zinc lies in a range of from 0.01 to 0.6%.

4. The primary cell of claim 3 wherein the quantity of lead alloyed with the refined zinc lies in a range of from 0.02 to 0.1%.

5. The primary cell of claim 1 wherein the refined zinc is alloyed with quantities of indium in a range of from 0.0005 to 0.1; bismuth in a range of from 0.0005 to 0.05%; magnesium in a range of from 0.0001 to 0.1%; and lithium in a range of from 0.0005 to 0.05%.

6. The primary cell of claim 5 wherein the refined zinc is alloyed with quantities of indium in a range of from 0.003 to 0.03%; bismuth in a range of from 0.001 to 0.01%; magnesium in a range of from 0.0001 to 0.002%; and lithium in a range of from 0.001 to 0.01%.

* * * * *